United States Patent Office 3,384,754
Patented May 21, 1968

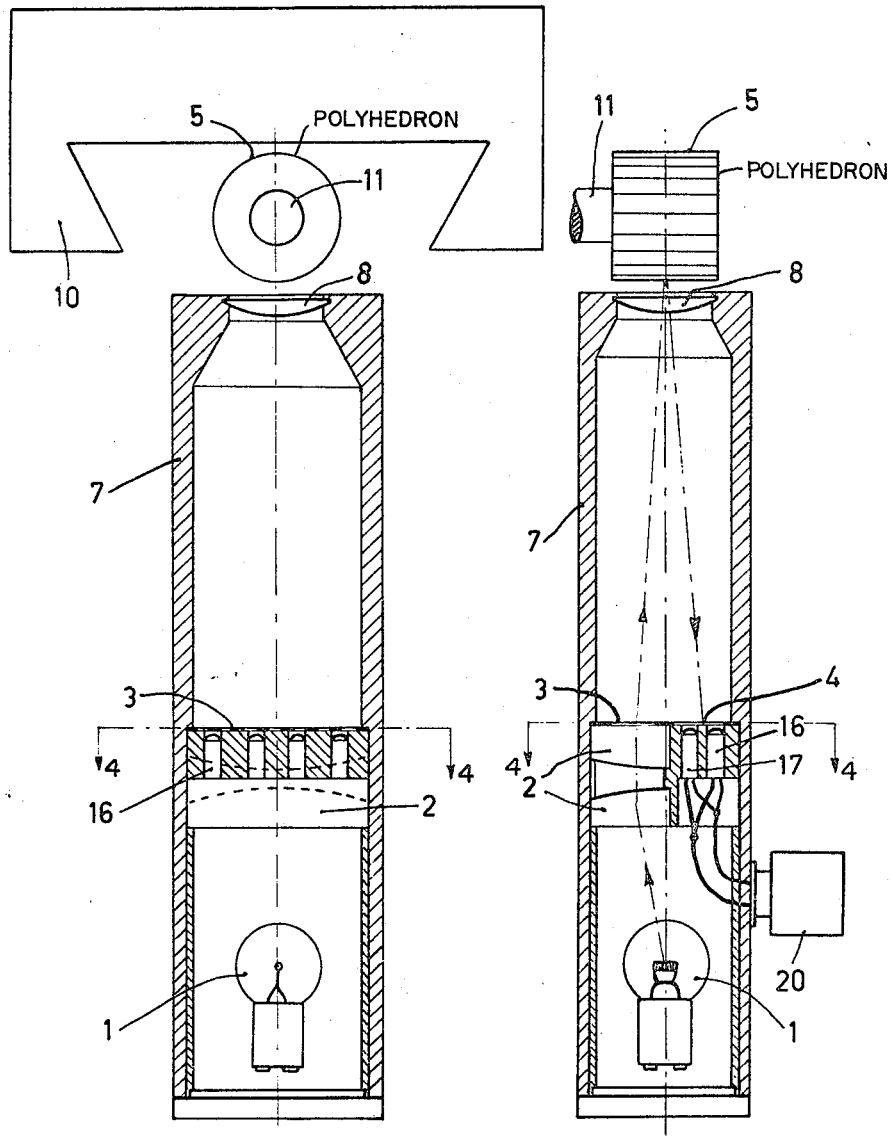

3,384,754
POSITION MEASURING DEVICE EMPLOYING A ROTATING REFLECTING POLYHEDRON TO SUPERIMPOSE THE REFLECTION OF A FIRST RASTER ONTO A SECOND RASTER, AND PHOTOCELLS FOR DETECTING THE RESULTANT MOVEMENT
Scato Albarda, Emmasingel, Eindhoven, Netherlands, assignor to North American Philips Company, Inc., New York, N.Y., a corporation of Delaware
Filed Dec. 29, 1964, Ser. No. 421,935
Claims priority, application Netherlands, Jan. 11, 1964, 64—161
5 Claims. (Cl. 250—224)

ABSTRACT OF THE DISCLOSURE

A position measuring device for indicating the rotatoin of a shaft is provided with a rotating reflecting polyhedron attached to the shaft and rotating therewith. A source of light passing through a fixed position causes a first raster pattern located at the fixed position to be reflected from the polyhedron onto a second raster pattern. A bank of photocells is then employed to detect the resulting interference pattern and thereby provide an electrical indication of the relative movement.

---

This invention relates generally to position measuring devices and specifically to devices for optically determining the position of a moving and more particularly rotating member with respect to a stationary member. Such optical position measurement will utilize a light beam impinging on a body mechanically coupled to the moving member, the said light beam subsequently irradiating at least one photo-electric cell which provides an electric signal.

Such a device is frequently used in machine tool control. It is often desired to determine the position of a machine tool, for example, a slide of a lathe with respect to a fixed object, such as the work-piece being processed. To this end, a disc provided with slots, preferably radial, is fitted on the shaft of the slide. A light beam incident on the disc at right angle is either interrupted, or passed through one of the slots and then impinges on a photoelectric cell. The photocell, which is preferably included in the input stage of an amplifier, provides a number of pulses which depends on the number of slots intersecting the light beam and hence on the position of the shaft.

It is also known to use two light paths with a separate photocell for each light path. The interruption of one light path is obviated before or after the interruption of the other light path. One light beam preferably passes a quarter of a period before or after the passage of the other light beam. The term "period" is to be understood herein to mean the time which elapses between two sequential passages of one beam. With a rotating disc this means that two hole patterns are formed in the disc, one pattern having a pitch which is shifted by $(m \pm \frac{1}{4})$ pitches of the other pattern in the direction of rotation. Two series of signals are thus obtained so that each signal of one series has a phase difference of 90° with respect to the preceding or succeeding signal of the other series. The series of signals may be applied, after conversion, to a counting circuit which adds the pulses (for example if the disc is rotating in the clockwise direction) or subtracts the pulses (if the disc is rotating in the counterclockwise direction).

An object of the invention is to obtain two important improvements with respect to the known device.

To this end, it is characterized in that the body which is mechanically coupled to the moving member is a light-reflecting regular polyhedron the axis of which coincides or substantially coincides with the axis of the moving member.

In the first place the rotating reflective polygon may perform, with respect to the fixed part of the receiver, all sorts of parasitic movements with regard to eccentricity or non-coincidence of the axis of the polyhedron with the axis of rotation. These movements are, or course, bound to certain limits which are, however, of the order of 0.5 mms. and do not therefore entail any restriction for the construction of the machine.

As a result, the reflective polyhedron may be secured directly to the rotary part of the machine and need not be supported in the receiver. Apart from direct saving in construction this has the following consequences:

(a) No centering of the receiver with respect to the rotary part of the machine.

(b) No additional rotational resistance of the machine element to which the receiver is coupled; this is extremely important if the said element is the index of a balance.

The receiver is the portion of the device which ultimately intercepts and transduces the light beam into an electric signal.

In the second place the reflective polygon may be small for a given resolving power compared with a perforated disc. A perforated disc receiver hardly provides a solution by which sufficient resolving power is obtained within the given diameter ($\pm 28$ mms. permissible).

The reasons why the reflective polygon may be comparatively small in diameter are:

(a) The reflective peripheral surfaces, comparable with the slotted holes of the disc, are located in the axial direction. In the perforated disc the internal diameter of the slot pattern determines the resolving power.

(b) The whole surface of the reflective polygon is reflecting and adds to the formation of the image.

It is to be noted that the maximum light transmissivity of the slotted disc is 0.5, while in a prior patent application it has been shown that an optimum image is obtained with a light transmissivity of approximately 0.33.

In order that the invention may be readily carried into effect, it will now be described in detail, by way of example, with reference to the accompanying diagrammatic drawings in which:

FIGURE 1 is a sectional view of a device according to the invention;

FIGURE 2 is a sectional view of a device according to the invention at right angles to that of FIGURE 1;

Figure 4:
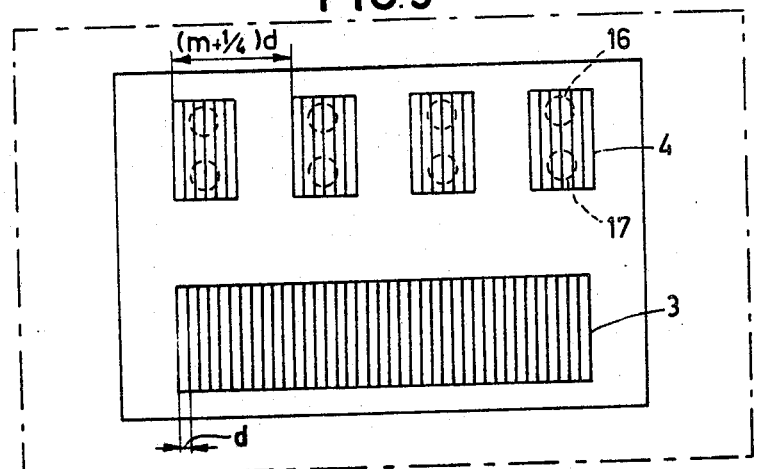

FIGURE 4 is a sectional view, taken on the line 4—4 of FIGURES 1 and 2. The essence of the present invention lies in the use of a completely reflective regular rotating polyhedron which is responsive to incident light for reflecting an image of a first fixed raster onto a second fixed raster. The rotation of the polyhedron, rotating in accordance with the rotation of a shaft whose position is being measured, provides a moving virtual image of the first raster upon the second raster. Photocells positioned beneath the second raster respond by providing output pulses in accordance with the rate of virtual movement of the first raster image on the second raster.

Figure 3:
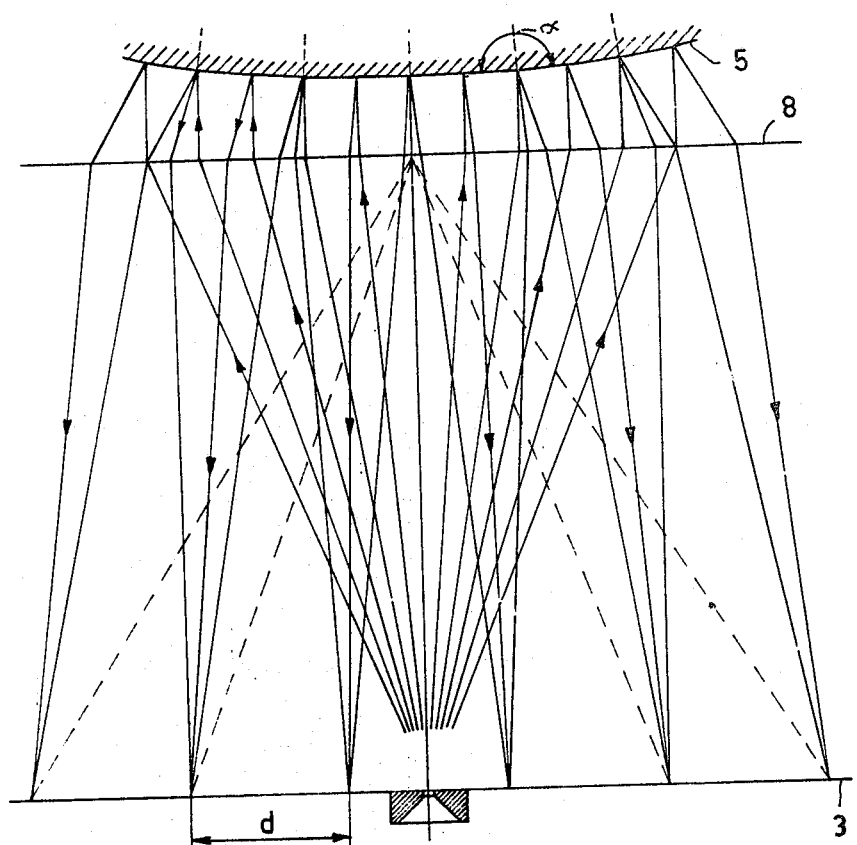
FIGURE 3 shows a detail of the device according to the invention.

Referring now to FIGURES 1 and 2, the reference numeral 11 indicates the shaft of a cross slide 10 of a lathe. The position of the cross slide 10 may be derived from the angular displacement of the shaft 11 from a given initial position. According to the invention, to this end, a reflective polygon 5 is fitted on the shaft 11 and illuminated by a lamp 1 included in a stationary receiver 7 positioned transversely of the shaft 11. The light rays emerging from the lamp 1 pass through condenser lenses 2 and illuminate a raster 3 arranged in the focal plane of a lens 8. The divergent light rays emerging from the parallel slots of the raster 3, after having passed the lens 8, are parallel. These parallel rays impinge on peripheral surfaces of the polygon 5 adjacent to the light beam. FIGURE 3 illustrates a ray diagram for one of the slots of raster 3 and shows a few peripheral surfaces, separated by dashed lines, with the parallel light rays incident thereon. These light rays are reflected. The light rays emerging from one peripheral surface are parallel and produce an image in the focal plane of the lens 8 which coincides with the plane of the raster 3. The images produced by the light rays emerging from a plurality of peripheral surfaces are located in the focal plane at a mutual distance $d$ (FIGURE 3).

It will readily be appreciated that the distance $d$ corresponds to the relationship $d = f \tan 4\pi/n$ where $n$ is the number of peripheral surfaces and $f$ is the focal length of the lens 8. For a high value of $n$ is $$d = 2\frac{2\pi}{n}f$$

Actually $n$ is large, that is to say the obtuse angle $\alpha$ between sequential peripheral surfaces is nearly 180°. The distance $d$ is thus small and hence the pitch of the raster 3 which is made equal to $d$. The raster 3 and the receiver 7 may therefore have small dimensions owing to the fact that $\alpha$ may be chosen to be nearly 180°.

If desired, the pitch of the raster 3 may be a whole fraction (having a numerator of "one") of $d$. In this case either the resolving power is increased (with the reflective polygon unchanged) or the number of peripheral surfaces is reduced (with the resolving power unchanged).

The construction has the further advantages that displacements of the shaft 11 in the axial direction and in a direction transverse and parallel to the shaft have no influence on the formation of the image. The last-mentioned displacements vary only the length of the light path between the lens 8 and the reflecting polyhedron 5, whereas the first-mentioned displacements shift the images in the image area in the longitudinal direction of the slots.

Placed in the image area is a raster constituted by two portions. One portion (having a pitch $d$) has a continuous character and is indicated by 3 in FIGURE 4. The other portion (4 in FIGURE 4) has a discontinuous character and comprises a plurality of groups. Each group has the mutual pitch $d$. The pitch of the groups is $(m+\frac{1}{4})d$. Upon rotation of the reflective polygon 5 the projection of the portion 3 slides over the portion 4. Four rows of photocells 16, 17 are present below the portion 4 and provide in known manner the electric signals for an electronic counter 20.

In one embodiment, $f = 57.3$ mms., $n = 360$, the pitch $d = 2$ mms. and $m = 3$.

What is claimed is:

1. A device for optically determining the position of a rotating member with respect to a fixed member, comprising a regular reflecting polyhedron mechanically coupled to said rotating member and substantially coaxial therewith, a first raster pattern and a second raster pattern mounted to said fixed member, means for directing an optical image of said first raster pattern to said reflecting polyhedron, means for directing the resultant image of said first raster pattern from said reflecting polyhedron to a plane substantially coinciding with the plane of said second raster pattern and to a position substantially coinciding with said second raster pattern, and photosensitive means positioned with respect to said second raster pattern so as to be responsive to the resultant optical interference pattern resulting from the superimposition of the image of said first raster pattern onto said second raster pattern.

2. A device for defining the displacement of an element having rotational movement relative to said device, comprising a source of light, means forming a first raster having alternating segments with complementary optical properties, means forming a second raster having alternating segments with complementary optical properties, said first and second rasters being fixedly mounted to said device, means for directing light from said source toward said first raster, a regular rotating polyhedron mounted substantially coaxially with said element and having rotational movement corresponding to the rotational movement of said element, each surface of said polyhedron being a reflecting surface, focusing means positioned between said first raster and said polyhedron for directing light from said first raster to a reflecting surface of said polyhedron, said first raster lying in the focal plane of said focusing means, each of said surfaces of said polyhedron being in turn positioned with respect to incident light thereon such that said incident light is redirected from said surface toward said second raster, said redirected incident light superimposing an image of said first raster onto said second raster, and light sensitive means positioned with respect to said second raster for indicating the total light resulting from the combined image.

3. A device for defining the displacement of an element having rotational movement relative to said device, comprising, a source of light, a first raster having alternating segments with complementary optical properties, said first and second rasters each positioned in the same plane relative to one another and each fixedly mounted to said device, first focusing means directing light from said source toward said raster, a regulator rotating polyhedron mounted to said element so as to be substantially coaxial therewith and having a rotational movement corresponding to the rotational movement of said element, each surface of said polyhedron reflecting light incident thereon, second focusing means positioned between said first raster and said polyhedron for directing light from said first raster to a reflecting surface of said polyhedron, said first raster lying in the focal plane of said second focusing means, one of said surfaces of said polyhedron being positioned with respect to said second focusing means and further positioned with respect to incident light thereon such that said incident light is redirected toward said second raster, said redirected incident light forming an image of said first raster having a virtual movement relative to said second raster, and light sensitive means for producing an electrical indication of the relative position of said element with respect to said device by responding to the total light resulting from the superimposition of the image of said first raster onto said second raster.

4. The combination of claim 3 wherein said first raster constitutes a continuous series of alternating segments with complementary optical properties, said second raster constitutes a plurality of individual groups of alternating segments with complementary optical properties, each of said individual groups having associated therewith a group of said photosensitive means.

5. The combination of claim 3 wherein the pitch of the virtual image of said first raster superimposed onto said second raster is equal to or a whole fraction of the pitch of said second raster.

References Cited

UNITED STATES PATENTS

| 1,951,523 | 3/1934 | Nicolson | 250—231 X |
|---|---|---|---|
| 2,406,299 | 8/1946 | Koulicovitch | 250—231 X |
| 2,586,540 | 2/1952 | Holden | 250—230 X |
| 3,309,525 | 3/1967 | Johnson | 250—231 |

RALPH G. NILSON, *Primary Examiner.*

J. D. WALL, T. N. GRIGSBY, *Assistant Examiners.*